US012183908B2

(12) United States Patent
Sun et al.

(10) Patent No.: US 12,183,908 B2
(45) Date of Patent: *Dec. 31, 2024

(54) BATTERY, POWER CONSUMPTION DEVICE, AND METHOD AND DEVICE FOR PRODUCING BATTERY

(71) Applicant: CONTEMPORARY AMPEREX TECHNOLOGY (HONG KONG) LIMITED, Hong Kong (CN)

(72) Inventors: Zhanyu Sun, Ningde (CN); Lei Wang, Ningde (CN); Xingdi Chen, Ningde (CN); Peng Wang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 649 days.

This patent is subject to a terminal disclaimer.

(21) Appl. No.: 17/464,048

(22) Filed: Sep. 1, 2021

(65) Prior Publication Data

US 2023/0026926 A1 Jan. 26, 2023

Related U.S. Application Data

(63) Continuation of application No. PCT/CN2021/107721, filed on Jul. 21, 2021.

(51) Int. Cl.
*H01M 10/6555* (2014.01)
*H01M 10/613* (2014.01)
(Continued)

(52) U.S. Cl.
CPC ..... *H01M 10/6555* (2015.04); *H01M 10/613* (2015.04); *H01M 10/615* (2015.04);
(Continued)

(58) Field of Classification Search
None
See application file for complete search history.

(56) References Cited

U.S. PATENT DOCUMENTS 9,450,219 B2 9/2016 Kim
10,840,486 B2 11/2020 Cao et al.
(Continued)

FOREIGN PATENT DOCUMENTS

CN 103000836 A 3/2013
CN 204067459 U 12/2014
(Continued)

OTHER PUBLICATIONS

Notice of Reasons for Refusal dated Oct. 30, 2023 received in Japanese Patent Application No. JP 2021-552651.
(Continued)

*Primary Examiner* — Anca Eoff
(74) *Attorney, Agent, or Firm* — Scully, Scott, Murphy & Presser, P.C.

(57) ABSTRACT

Provided is a battery, a power consumption device, a method and device for producing a battery. The battery includes: a battery module and a box body, the battery module accommodated in the box body; the battery module including: N rows of battery cells, each row of battery cells arranged along a first direction, and the N rows of battery cells arranged along a second direction, and N being an integer greater than 1; N−1 spacer plate(s), the spacer plate extending along the first direction and disposed between two adjacent rows of battery cells, and the spacer plate fixedly connected to each of the battery cells in the two rows of the battery cells; where a fixing structure is provided on an end portion of the spacer plate in the first direction, and the spacer plate is fixed to the box body via the fixing structure.

19 Claims, 11 Drawing Sheets

(51) Int. Cl.
  *H01M 10/615*  (2014.01)
  *H01M 10/653*  (2014.01)
  *H01M 50/209*  (2021.01)
  *H01M 50/213*  (2021.01)
  *H01M 50/262*  (2021.01)
  *H01M 50/291*  (2021.01)

(52) U.S. Cl.
  CPC ....... *H01M 50/209* (2021.01); *H01M 50/213* (2021.01); *H01M 50/262* (2021.01); *H01M 50/291* (2021.01); *H01M 10/653* (2015.04); *H01M 2220/20* (2013.01)

(56) References Cited

U.S. PATENT DOCUMENTS

| | | | | |
|---|---|---|---|---|
| 2003/0141842 | A1* | 7/2003 | Izawa | H01M 50/503 320/116 |
| 2012/0028099 | A1* | 2/2012 | Aoki | H01M 10/643 429/120 |
| 2013/0071713 | A1 | 3/2013 | Kim | |
| 2013/0288099 | A1 | 10/2013 | Kim | |
| 2015/0125727 | A1* | 5/2015 | Lui | H01M 50/507 429/90 |
| 2019/0305272 | A1 | 10/2019 | Cao et al. | |
| 2020/0287179 | A1 | 9/2020 | Wang et al. | |
| 2021/0320368 | A1 | 10/2021 | Huang et al. | |
| 2021/0367301 | A1 | 11/2021 | Matsuo et al. | |
| 2022/0416343 | A1 | 12/2022 | He et al. | |
| 2023/0327264 | A1* | 10/2023 | Sun | H01M 10/615 429/120 |

FOREIGN PATENT DOCUMENTS

| | | |
|---|---|---|
| CN | 206022453 U | 3/2017 |
| CN | 106848141 A | 6/2017 |
| CN | 207217617 U | 4/2018 |
| CN | 207818712 U | 9/2018 |
| CN | 208014836 U | 10/2018 |
| CN | 209447862 U | 9/2019 |
| CN | 110323371 A | 10/2019 |
| CN | 111009629 A | 4/2020 |
| CN | 111430611 A | 7/2020 |
| CN | 212659640 U | 3/2021 |
| CN | 212967818 U | 4/2021 |
| EP | 2658008 A1 | 10/2013 |
| JP | 2020191156 A | 11/2020 |
| KR | 101247390 B1 | 3/2013 |
| WO | 2013098982 A1 | 7/2013 |
| WO | 2016128180 A1 | 8/2016 |
| WO | 2020135103 A1 | 7/2020 |
| WO | 2020215908 A1 | 10/2020 |

OTHER PUBLICATIONS

Extended European Search Report dated Jan. 19, 2023 received in European Patent Application No. EP 21758579.3.

Notice of Preliminary Rejection dated Jul. 18, 2023 received in Korean Patent Application No. KR 10-2021-7028055.

* cited by examiner

BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2021/107721, filed on Jul. 21, 2021, the disclosure of which is hereby incorporated by reference in its entirety.

TECHNICAL FIELD

The present application relates to the field of battery technologies, and in particular, to a battery, a power consumption device, and a method and device for producing a battery.

BACKGROUND

With the increasing environmental pollution, the new energy industry has attracted more and more attention. In the new energy industry, the battery technology is an important factor related to their development.

The space utilization rate of the interior of the battery affects the power and energy density of the battery, which further affects the performances of the battery. How to improve the performances of the battery is an urgent technical problem to be solved in the battery technology.

SUMMARY

The present application provides a battery, a power consumption device, and a method and device for producing a battery, which may improve an energy density of the battery while ensuring a structural strength of the battery, thereby improving performances of the battery.

In a first aspect, a battery is provided, including: a battery module and a box body, the battery module accommodated in the box body; the battery module including: N rows of battery cells, each row of battery cells in the N rows of battery cells arranged along a first direction, the N rows of battery cells arranged along a second direction, N being an integer greater than 1, and the first direction being perpendicular to the second direction; N−1 spacer plate(s), the spacer plate extending along the first direction and disposed between two adjacent rows of battery cells, and the spacer plate fixedly connected to each of the battery cells in the two rows of the battery cells; where a fixing structure is provided on an end portion of the spacer plate in the first direction, and the spacer plate is fixed to the box body via the fixing structure.

In the embodiment of the present application, the spacer plate is disposed between two adjacent rows of battery cells of the battery module, and the spacer plate is fixedly connected to each of the battery cells in the two rows of the battery cells, the fixing structure is provided on the end portion of the spacer plate, and the spacer plate is fixed to the box body via the fixing structure. In this way, each of the battery cells in the battery is fixed to the box body by the spacer plate and the fixing structure, so each of the battery cells may transmit its load to the box body, ensuring the structural strength of the battery. In this case, there is no need to provide a side plate on an outer side of the battery module, and also there is no need to provide a beam or other structures in the middle of the box body, which may greatly improve the space utilization rate of the interior of the battery, thereby improving the energy density of the battery. Thus, a technical solution of the embodiment of the present application may improve the energy density of the battery while ensuring the structural strength of the battery, thereby improving the performances of the battery.

In a possible implementation manner, a thickness of the spacer plate may be 0.1-5 mm, 0.2-2 mm, 0.3-1 mm, 0.1-0.5 mm, or 0.2-0.4 mm. Adopting the spacer plate of the thickness may reduce a space occupied by the spacer plate while ensuring the strength.

In a possible implementation manner, adjacent battery cells in each row of battery cells may also be bonded, for example, bonded by a structural glue. A fixing effect of the battery cells may be further enhanced through fixing between the adjacent battery cells in each row of battery cells.

In a possible implementation manner, the battery includes a plurality of the battery modules, the plurality of the battery modules arranged along the second direction, where there is a gap between adjacent battery modules.

In a battery module, the spacer plate is provided between two rows of battery cells, and no spacer plate is provided between adjacent battery modules. In this way, on one hand, the spacer plate inside the battery may be reduced as many as possible; and on the other hand, a certain gap may be formed between the adjacent battery modules to provide an expansion space for the battery cells.

In a possible implementation manner, the fixing structure includes a fixing plate, and the fixing plate is fixedly connected to the end portion of the spacer plate, and is fixedly connected to a battery cell located at the end portion of the spacer plate. In this way, the fixing effect of the battery cells may be further strengthened.

In a possible implementation manner, the fixing plate includes a first connecting portion formed by extending along the first direction to a direction away from the battery module, and the first connecting portion is configured to be connected to a wall of the box body.

Connecting the wall of the box body through the first connecting portion may implement the fixed connection between the fixing plate and the wall of the box body, so that loads of the battery cells may be transmitted to the wall of the box body, thereby ensuring the structural strength of the battery.

In a possible implementation manner, the first connecting portion may be formed by bending the fixing plate. For example, the first connecting portion may be formed by bending an edge of the fixing plate close to the connected wall in a direction away from the battery module. In this way, the first connecting portion and a main body of the fixing plate are an integral structure, which may enhance connection performances.

In a possible implementation manner, the battery further includes: a first connecting strip, the first connecting strip extending along the second direction and configured to connect the plurality of the battery modules in the box body; where the fixing plate further includes a second connecting portion formed by extending along the first direction to a direction away from the battery module, and the second connecting portion is configured to be connected to the first connecting strip.

The first connecting strip is connected through the second connecting portion, so that the structural strength of the battery may be further ensured at a position away from the bottom wall of the box body through the first connecting strip.

In a possible implementation manner, the second connecting portion may be formed by bending the fixing plate. For example, the second connecting portion may be formed by bending an edge of the fixing plate close to the first connecting strip in a direction away from the battery module. In this way, the second connecting portion and the main body of the fixing plate are an integral structure, which may enhance the connection performances.

In a possible implementation manner, the fixing plate further includes a third connecting portion formed by extending along the first direction to a direction away from the battery module, and the third connecting portion is configured to connect the fixing plate and the spacer plate. Connecting the spacer plate through the third connecting portion may implement the fixed connection between the fixing plate and the spacer plate, ensuring the connection performances between the two.

In a possible implementation, the third connecting portion may be formed by bending the fixing plate. For example, the third connecting portion may be formed by bending an edge of the fixing plate close to the spacer plate to a direction away from the battery module. In this way, the third connecting portion and the main body of the fixing plate are an integral structure, which may enhance the connection performances.

In a possible implementation manner, the fixing plate corresponding to a plurality of battery modules is an integral structure. The fixing plate corresponding to the plurality of battery modules is a whole plate, and the plurality of battery modules are fixed on the box body through this whole plate, thereby improving the overall structural strength of the plurality of battery modules.

In a possible implementation manner, the fixing plate is provided with a limiting bar corresponding to the battery module, and the limiting bar is configured to insert into a gap between the adjacent battery modules. This may facilitate installation of the battery module.

In a possible implementation manner, the end portion of the spacer plate protrudes from the N rows of the battery cells in the first direction, and the fixing structure includes a first protrusion portion of the end portion of the spacer plate that protrudes from the N rows of the battery cells in the first direction. Connecting the wall of the box body through the first protrusion portion may transmit loads of the battery cells to the wall of the box body, thereby ensuring the structural strength of the battery.

In a possible implementation manner, the fixing structure further includes a first extending portion, the first extending portion is fixedly connected to the first protrusion portion and extends along the second direction, and the first extending portion is configured to be connected to a wall of the box body.

Connecting the wall of the box body through the first extending portion may implement the fixed connection between the spacer plate and the wall of the box body, so that the loads of the battery cells may be transmitted to the wall of the box body, thereby ensuring the structural strength of the battery.

In a possible implementation manner, the first extending portion and the first protrusion portion may be integrally formed, so that the connection performances may be enhanced.

In a possible implementation manner, the battery further includes: a first connecting strip, the first connecting strip extending along the second direction and configured to connect the plurality of battery modules in the box body; where the fixing structure further includes a second extending portion, the second extending portion is fixedly connected to the first protrusion portion and extends along the second direction, and the second extending portion is configured to be connected to the first connecting strip.

The first connecting strip is connected through the second extending portion, so that the structural strength of the battery may be further ensured at a position away from the bottom wall of the box body through the first connecting strip.

In a possible implementation manner, the second extending portion and the first protrusion portion may be integrally formed, so that the connection performances may be enhanced.

In a possible implementation manner, the battery module further includes: an attaching plate, the attaching plate extending along the first direction and fixedly connected to the spacer plate, and the attaching plate protruding from the spacer plate along the second direction and attached to each of the battery cells in the two adjacent rows of the battery cells. Through the attaching plate, the fixing effect of the battery cells may be further strengthened.

In a possible implementation manner, the attaching plate is fixedly connected to each of the battery cells in the two adjacent rows of the battery cells. In this way, each of the battery cells is fixed by the attaching plate and the spacer plate, so that the fixing effect may be further improved.

In a possible implementation manner, the attaching plate protrudes from the N rows of battery cells in the first direction, and the fixing structure includes a second protrusion portion of the attaching plate that protrudes from the N rows of battery cells in the first direction.

Connecting the wall of the box body through the second protrusion portion may transmit the loads of the battery cells to the wall of the box body, thereby ensuring the structural strength of the battery.

In a possible implementation, the spacer plate and the attaching plate are integrally formed. In this way, the connection performances between the spacer plate and the attaching plate may be improved.

In a possible implementation, N is 2. In this way, fewer spacer plates may be provided in the battery, but at the same time, it may be ensured that each of the battery cells may be fixed to the spacer plate and connected to the box body through the spacer plate and the fixing structure.

In a possible implementation manner, the battery cell is a cuboid battery cell, the cuboid battery cell includes two opposite first side walls and two opposite second side walls, an area of the first side wall is larger than an area of the second side wall, and the spacer plate is fixedly connected to the first side wall.

Narrow side walls of each row of battery cells are connected so as to be arranged in a row along the first direction; the spacer plate is fixedly connected with wide side walls of each of the battery cells, so that the spacer plate may more easily receive the loads of the battery cells, so as to facilitate the loads of the battery cells to be transmitted to the box body.

In a possible implementation manner, the spacer plate has a hole disposed corresponding to the first side wall, and an area of the hole is smaller than an area of the first side wall. Providing a hole on the spacer plate may reduce the material of the spacer plate, thereby reducing a weight of the spacer plate.

In a possible implementation manner, the battery cell is a cylindrical battery cell, and the spacer plate is an S-shaped spacer plate adapted to a side of the cylindrical battery cell, which may better connect each of the battery cells.

In a possible implementation manner, the spacer plate is an insulation plate, a cooling plate or a heating plate. In this way, while fixing the battery cells, heat insulation between the battery cells or cooling or heating of the battery cells may also be implemented at the same time.

In a possible implementation manner, the spacer plate and the box body are integrally formed, so that the connection performances between the spacer plate and the box body may be improved.

In a possible implementation manner, the battery further includes: a bus component, configured to electrically connect the battery cells; where at least three battery cells in the battery module are connected to a battery cell in other battery modules through the bus component.

More battery cells are connected to the battery cell in other battery modules through the bus component, and the connection performances between the battery modules may be enhanced through the bus component.

In a possible implementation manner, the bus component is configured to connect the battery cells in series along the second direction. In this way, each pair of the adjacent battery cells between the adjacent battery modules may be connected through the bus component, so that the connection performances between the battery modules may be enhanced.

In a possible implementation manner, the battery module is disposed on a bottom wall of the box body. The battery further includes: a second connecting strip, disposed on a surface of the battery module away from the bottom wall of the box body, and the second connecting strip extending along the second direction, and fixedly connected to the plurality of battery modules in the box body.

Through the second connecting strip, the battery cells may be constrained in the second direction to increase the structural strength of the battery, and an expansion force of the battery cells may be resisted at the same time.

In a second aspect, a power consumption device is provided, including: the battery in the above first aspect or any possible implementation manner of the first aspect, the battery being configured to provide electric energy.

In a third aspect, a method for producing a battery is provided, including: providing a battery module, the battery module including: N rows of battery cells, each row of battery cells in the N rows of battery cells arranged along a first direction, and the N rows of battery cells arranged along a second direction, N being an integer greater than 1, and the first direction being perpendicular to the second direction; N−1 spacer plate(s), the spacer plate extending along the first direction and disposed between two adjacent rows of battery cells, and the spacer plate fixedly connected to each of the battery cells in the two rows of the battery cells; where a fixing structure is provided on an end portion of the spacer plate in the first direction; providing a box body; accommodating the battery module in the box body, where the spacer plate is fixed to the box body via the fixing structure.

In a fourth aspect, a device for producing a battery is provided, including a module for executing the method provided in the above third aspect.

In the technical solution of the embodiment of the present application, the spacer plate is disposed between two adjacent rows of battery cells of the battery module, and the spacer plate is fixedly connected to each of the battery cells in the two rows of the battery cells, the fixing structure is provided on the end portion of the spacer plate, and the spacer plate is fixed to the box body via the fixing structure. In this way, each of the battery cells in the battery is fixed to the box body by the spacer plate and the fixing structure, so each of the battery cells may transmit its load to the box body. Thus, the technical solution of the embodiment of the present application may improve the energy density of the battery while ensuring the structural strength of the battery, thereby improving the performances of the battery.

BRIEF DESCRIPTION OF DRAWINGS

In order to illustrate the technical solution in the embodiments of the present application more clearly, brief description will be made below to the drawings required in the embodiments of the present application, and apparently, the drawings described below are some embodiments of the present application only, and other drawings could be obtained based on these drawings by those ordinary skilled in this art without creative efforts.

Figure 1:
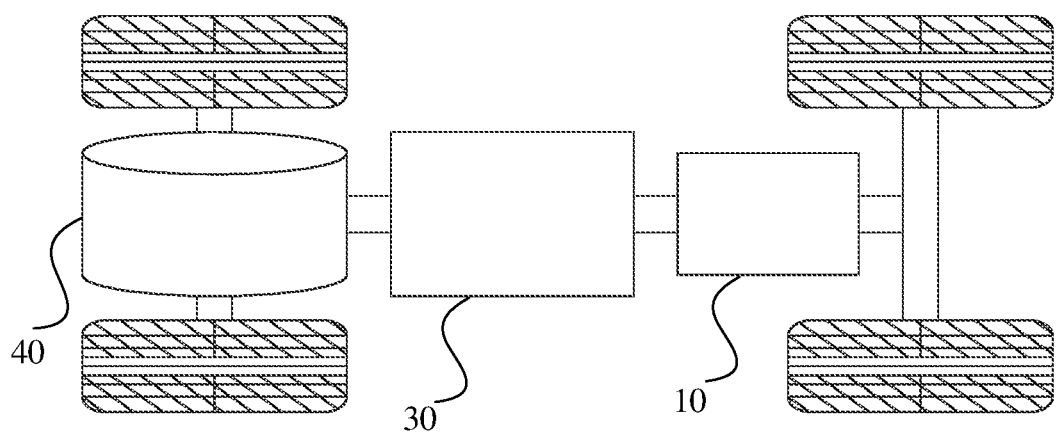
FIG. 1 is a schematic diagram of a vehicle according to an embodiment of the present application.

In the drawings, the drawings are not drawn to actual scale.

DESCRIPTION OF EMBODIMENTS

Implementations of the present application will be further described below in detail with reference to the drawings and embodiments. The detailed description of the following embodiments and the accompanying drawings are used to exemplarily illustrate principles of the present application, but cannot be used to limit the scope of the present application, that is, the present application is not limited to the described embodiments.

In the depiction of the present application, it is noted that unless otherwise defined, all technological and scientific terms used have the same meanings as those commonly understood by those skilled in the art to which the present application belongs. The terms used are merely for the purpose of describing specific embodiments, but are not intended to limit the present application. The terms "including" and "having" and any variations thereof in the specification and the claims of the present application as well as the brief description of the drawings described above are intended to cover non-exclusive inclusion. "A plurality of" means more than two; and orientations or positional relationships indicated by terms such as "up", "down", "left", "right", "inside", and "outside" are merely for convenience of describing the present application and for simplifying the description, rather than for indicating or implying that an apparatus or element indicated must have a specific orientation, and must be constructed and operated in a specific orientation, which thus may not be understood as a limitation the present application. In addition, the terms "first", "second", and "third" are only intended for the purpose of description, and shall not be understood as an indication or implication of relative importance. "Vertical" is not strictly vertical, but within an allowable range of error. "Parallel" is not strictly parallel, but within an allowable range of error.

The phrase "embodiments" referred to in the present application means that the descriptions of specific features, structures, and characteristics in combination with the embodiments are included in at least an embodiment of the present application. The phrase at various locations in the specification does not necessarily refer to the same embodiment, or an independent or alternative embodiment exclusive of another embodiment. Those skilled in the art understand, in explicit and implicit manners, that an embodiment described in the present application may be combined with another embodiment.

The terms representing directions in the following description are all directions shown in the drawings, and limit the specific structure of the present application. In the description of the present application, it should be further noted that unless otherwise explicitly specified and defined, the terms "mounting", "connecting" and "connection" should be understood in a broad sense; for example, they may be a fixed connection, a detachable connection, or an integrated connection; may be a direct connection and may also be an indirect connection through an intermediate medium, or may be communication between the interiors of two elements. Those of ordinary skill in the art may appreciate the specific meanings of the foregoing terms in the present application according to specific circumstances.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relation.

In the present application, battery cells may include lithium-ion secondary batteries, lithium-ion primary batteries, lithium-sulfur batteries, sodium/lithium-ion batteries, sodium-ion batteries or magnesium-ion batteries, etc., which are not limited by the embodiments of the present application. The battery cells may be cylindrical, flat, cuboid or in another shape, which is not limited by the embodiments of the present application. The battery cells are generally divided into three types according to the way of packaging: cylindrical battery cells, prismatic battery cells and pouch battery cells, which are not limited by the embodiments of the present application.

The battery mentioned in the embodiment of the present application refers to a single physical module that includes one or more battery cells to provide a higher voltage and capacity. For example, the battery mentioned in the present application may include a battery pack, etc. The battery generally includes a box body for enclosing one or more battery cells. The box body may prevent liquid or other foreign matters from affecting the charging or discharging of the battery cells.

The battery cells includes an electrode assembly and an electrolytic solution, and the electrode assembly is composed of a positive electrode sheet, a negative electrode sheet and an isolation film. The operation of the battery cells mainly relies on the movement of metal ions between the positive electrode sheet and the negative electrode sheet. The positive electrode sheet includes a positive electrode current collector and a positive electrode active material layer. The positive electrode active material layer is coated on a surface of the positive electrode current collector, and the current collector not coated with the positive electrode active material layer protrudes from the current collector coated with the positive electrode active material layer and serves as a positive electrode tab. In an example of a lithium-ion battery, the material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, and the current collector not coated with the negative electrode active material layer protrudes from the current collector coated with the negative electrode active material layer and serves as a negative electrode tab. A material of the negative electrode current collector may be copper, and the negative electrode active material may be carbon, silicon, or the like. In order to ensure that no fusing occurs when a large current passes through, there are a plurality of positive electrode tabs which are stacked together, and there are a plurality of negative electrode tabs which are stacked together. A material of the isolation film may be polypropylene (PP) or polyethylene (PE), etc. In addition, the electrode assembly may be a winding structure or a laminated structure, and the embodiments of the present application are not limited thereto.

In order to meet different power demands, the battery may include a plurality of battery cells, where the plurality of battery cells may be in series connection, parallel connection or series-parallel connection. The series-parallel connection refers to a combination of series connection and parallel connection. Optionally, a plurality of battery cells may be first connected in series, in parallel or in series and parallel to form a battery module, and then a plurality of battery modules are connected in series, in parallel or in series and parallel to form a battery. That is, a plurality of battery cells may directly form a battery, or may first form a battery module, and then battery modules form a battery. The battery is further provided in a power consumption device to provide electrical energy for the power consumption device.

With the development of the battery technology, it is necessary to consider design factors in multiple aspects simultaneously, such as energy density, cycle life, discharge capacity, C-rate, safety, etc. Among them, when an internal space of the battery is fixed, improving the utilization rate of the internal space of the battery is an effective means to improve the energy density of the battery. However, while improving the utilization rate of the internal space of the battery, it is possible to reduce the structural strength of the battery. For example, a beam used to mount the battery module is usually provided inside the box body of the battery. In addition, the battery module in the battery is also provided with a side plate and an end plate. The above-mentioned beam, side plate and end plate not only implement fixing the battery, but also occupy the internal space of the battery. However, if the beam, the side plate and the end plate are not provided, the structural strength of the battery will be insufficient, and performances of the battery will be affected.

In view of this, an embodiment of the present application provides a technical solution. A spacer plate is disposed between two adjacent rows of battery cells of a battery module, and the spacer plate is fixedly connected to each of the battery cells in the two rows of battery cells, and then fixed to a box body through a fixing structure. In this way, each of the battery cells in the battery is fixed to the box body by the spacer plate and the fixing structure, which may transmit its load to the box body, ensuring the structural strength of the battery. In this case, there is no need to provide a side plate on an outer side of the battery module, and also there is no need to provide a beam or other structures in the middle of the box body, which may greatly improve the space utilization rate of the interior of the battery, thereby improving the energy density of the battery. Thus, the technical solution of the embodiment of the present application may improve the energy density of the battery while ensuring the structural strength of the battery, thereby improving the performances of the battery.

Technical solutions described in embodiments of the present application are all applicable to various apparatuses using batteries, such as mobile phones, portable devices, notebook computers, electromobiles, electronic toys, electric tools, electric vehicles, ships or spacecrafts. For example, the spacecrafts include airplanes, rockets, space shuttles, spaceships, or the like.

It should be understood that the technical solutions described in the embodiments of the present application are not only applicable to the devices described above, but also applicable to all devices using batteries. However, for brief description, the following embodiments are all described by an example of an electric vehicle.

For example, FIG. 1 is a schematic structural diagram of a vehicle 1 according to an embodiment of the present application. The vehicle 1 may be a fuel-powered vehicle, a gas-powered vehicle or a new-energy vehicle. The new-energy vehicle may be a battery electric vehicle, a hybrid vehicle or an extended-range vehicle, or the like. A motor 40, a controller 30 and a battery 10 may be provided inside the vehicle 1, and the controller 30 is configured to control the battery 10 to supply power to the motor 40. For example, the battery 10 may be provided at the bottom or the head or the tail of the vehicle 1. The battery 10 may be configured to supply power to the vehicle 1. For example, the battery 10 may be used as an operation power supply of the vehicle 1 and is used for a circuit system of the vehicle 1, for example, for a working power demand of the vehicle 1 during startup, navigation and running. In another embodiment of the present application, the battery 10 may be used not only as an operation power source of the vehicle 1, but also as a driving power source of the vehicle 1, replacing or partially replacing fuel or natural gas to provide driving power for the vehicle 1.

Figure 2:
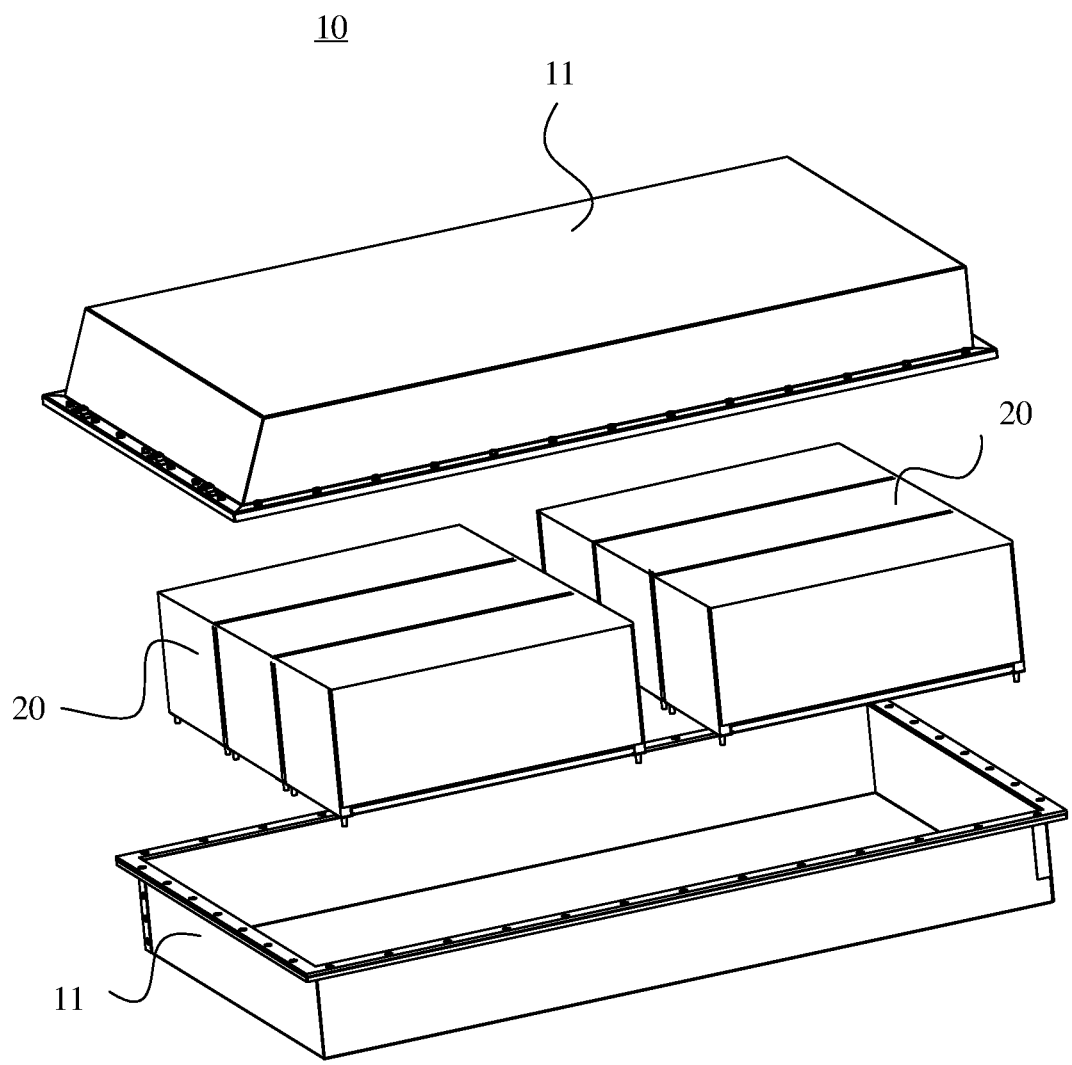
FIG. 2 is a schematic diagram of a battery according to an embodiment of the present application.

In order to satisfy different power demands, the battery 10 may include a plurality of battery cells. For example, as shown in FIG. 2, it is a schematic structural diagram of a battery 10 according to an embodiment of the present application. The battery 10 may include a plurality of battery cells 20. The battery 10 may further include a box body 11 with a hollow structure inside, and the plurality of battery cells 20 are accommodated in the box body 11. For example, the plurality of battery cells 20 are connected in series or in parallel or in a hybrid and are then placed in the box body 11.

Optionally, the battery 10 may also include other structures, which will not be described in detail herein. For example, the battery 10 may also include a bus component. The bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 may be further led out through an electrically conductive mechanism passing through the box body. Optionally, the electrically conductive mechanism may also belong to the bus component.

According to different power requirements, the number of the battery cells 20 may be set as any value. The plurality of battery cells 20 may be connected in series or in parallel or in a hybrid manner to implement larger capacity or power. Since there may be many battery cells 20 included in each battery 10, the battery cells 20 may be provided in groups for convenience of installation, and each group of battery cells 20 constitutes a battery module. The number of the battery cells 20 included in the battery module is not limited and may be set as required. The battery may include a plurality of battery modules, and these battery modules may be connected in series, in parallel or in series and parallel.

Figure 3:
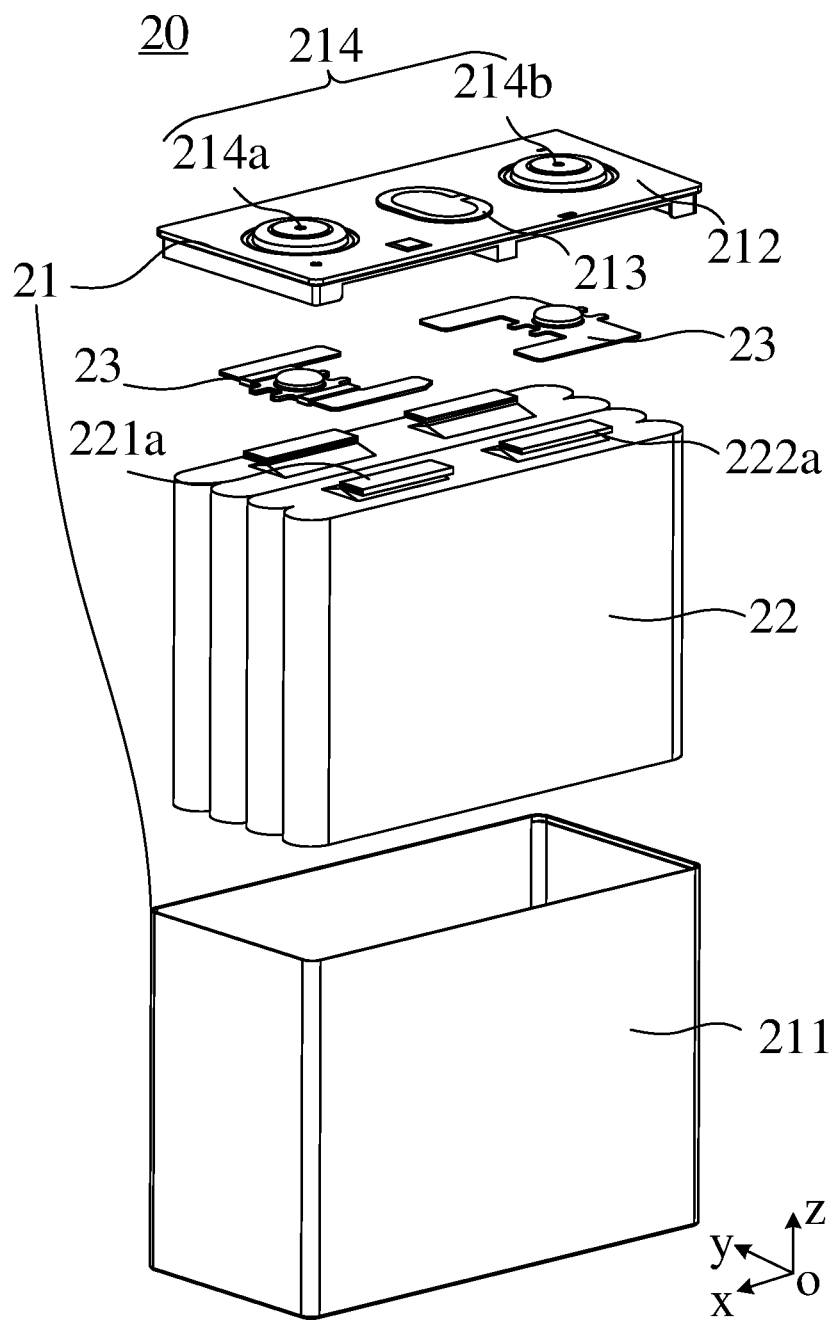
FIG. 3 is a schematic diagram of a battery cell according to an embodiment of the present application.

FIG. 3 is a schematic structural diagram of a battery cell 20 according to an embodiment of the present application. The battery cell 20 includes one or more electrode assemblies 22, a housing 211 and a cover plate 212. The housing 211 and the cover plate 212 form a shell or a battery 21. A wall of the housing 211 and the cover plate 212 are both referred to as a wall of the battery cell 20, where for the cuboid battery cell 20, the wall of the housing 211 includes a bottom wall and four side walls. The housing 211 is shaped according to the combined shape of the one or more electrode assemblies 22. For example, the housing 211 may be a hollow cuboid or cube or cylinder, and one surface of the housing 211 has a hole such that the one or more electrode assemblies 22 may be placed in the housing 211. For example, when the housing 211 is a hollow cuboid or cube, one plane of the housing 211 is an opening surface, i.e., the plane does not have a wall, so that the inside and outside of the housing 211 are in communication with each other. When the housing 211 is a hollow cylinder, an end face of the housing 211 is an opening surface, i.e., the end face does not have a wall, so that the inside and outside of the housing 211 are in communication with each other. The cover plate 212 covers the hole and is connected with the housing 211 to form a closed chamber in which the electrode assembly 22 is placed. The housing 211 is filled with an electrolyte, such as an electrolytic solution.

The battery cell 20 may further include two electrode terminals 214, and the two electrode terminals 214 may be provided on the cover plate 212. The cover plate 212 is generally in the shape of a flat plate, and the two electrode terminals 214 are fixed on a flat plate surface of the cover plate 212. The two electrode terminals 214 are a positive electrode terminal 214a and a negative electrode terminal 214b, respectively. Each electrode terminal 214 is correspondingly provided with a connection member 23 also called a current collecting member 23, which is located between the cover plate 212 and the electrode assembly 22 and configured to electrically connect the electrode assembly 22 to the electrode terminal 214.

As shown in FIG. 3, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. The first electrode tab 221a of the one or more electrode assemblies 22 is connected to one electrode terminal through one connection member 23, and the second electrode tab 222a of the one or more electrode assemblies 22 is connected to the other electrode terminal through the other connection member 23. For example, the positive electrode terminal 214a is connected to the positive electrode tab through a connection member 23, and the negative electrode terminal 214b is connected to the negative electrode tab through the other connection member 23.

In the battery cells 20, according to actual usage requirements, there may be a single or a plurality of electrode assemblies 22. As shown in FIG. 3, there are four independent electrode assemblies 22 in the battery cells 20.

A pressure relief mechanism 213 may also be disposed on the battery cells 20. The pressure relief mechanism 213 is configured to be actuated when an internal pressure or temperature of the battery cells 20 reaches a threshold, to relieve the internal pressure or temperature.

The pressure relief mechanism 213 may be in various possible pressure relief structures, which is not limited in the embodiment of the present application. For example, the pressure relief mechanism 213 may be a temperature-sensitive pressure relief mechanism configured to be capable of being melted when an internal temperature of the battery cells 20 provided with the pressure relief mechanism 213 reaches a threshold; and/or the pressure relief mechanism 213 may be a pressure-sensitive pressure relief mechanism configured to be capable of being fractured when an internal gas pressure of the battery cells 20 provided with the pressure relief mechanism 213 reaches a threshold.

Figure 4:
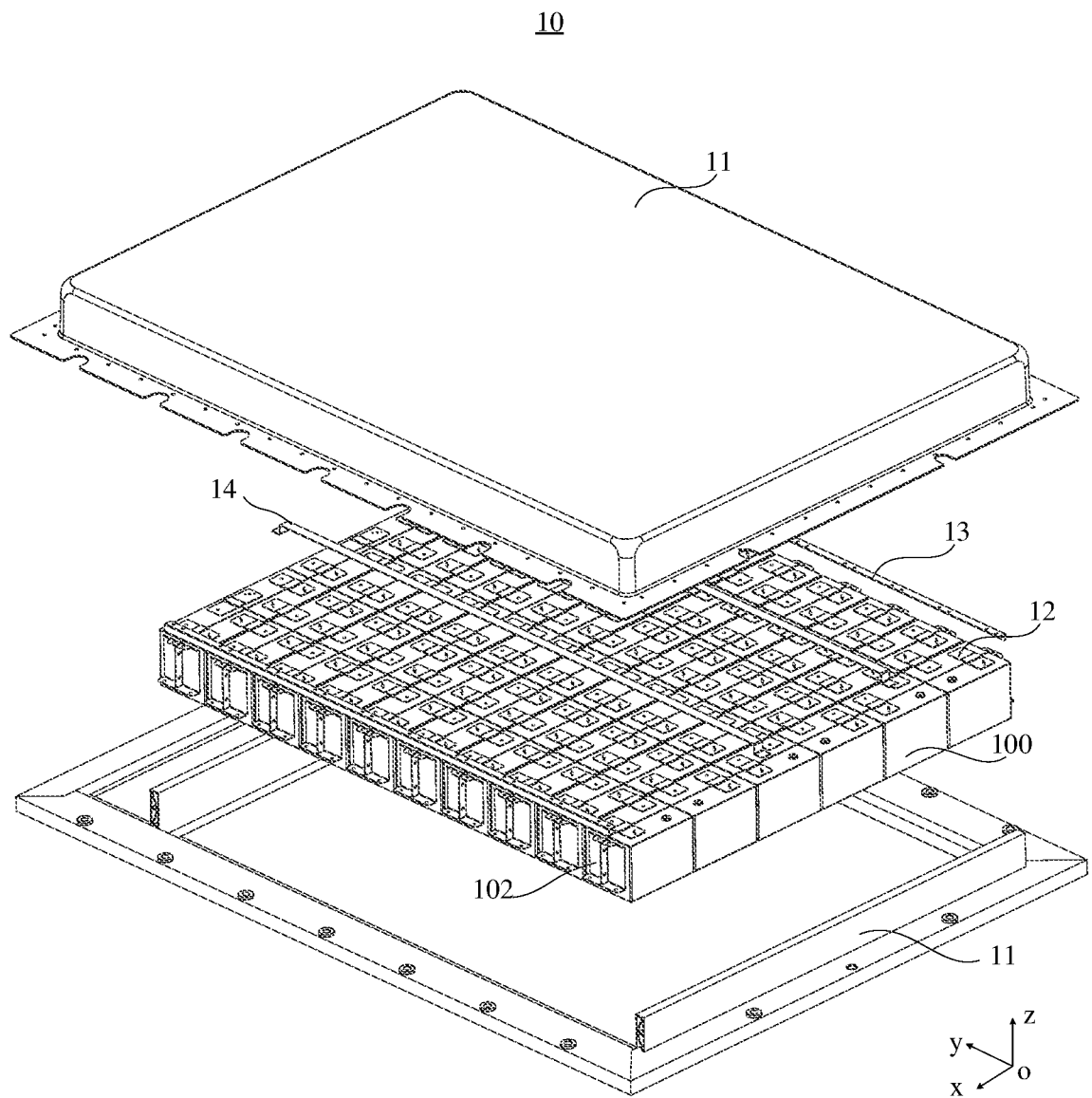
FIG. 4 is a schematic diagram of a battery according to an embodiment of the present application.
Figure 5:
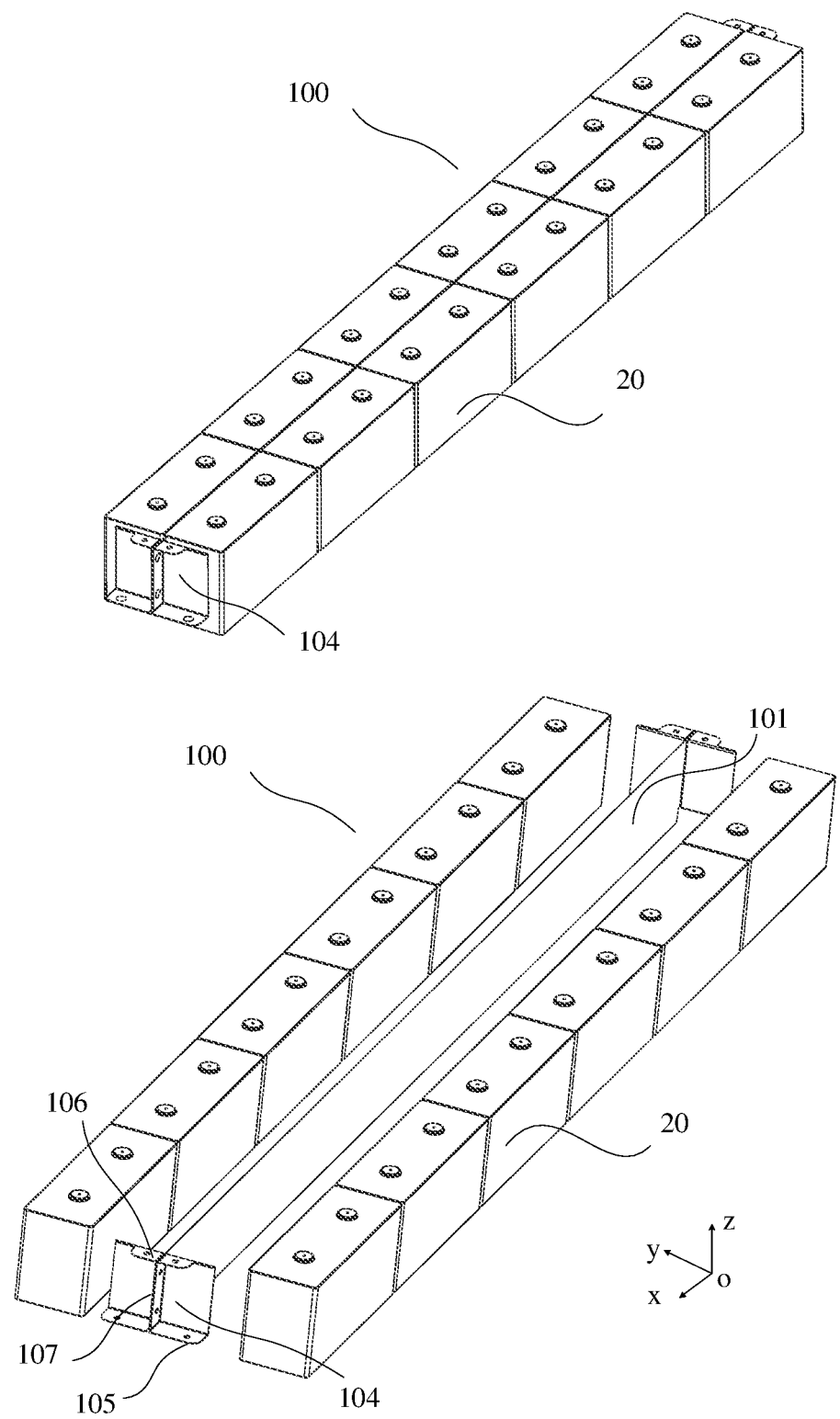
FIG. 5 is a schematic diagram of a battery module according to an embodiment of the present application.

FIG. 4 shows a schematic structural diagram of a battery 10 according to an embodiment of the present application. As shown in FIG. 4, the battery 10 includes a battery module 100 and a box body 11. The battery module 100 is accommodated in the box body 11. FIG. 5 shows a schematic structural diagram of the battery module 100 according to an embodiment of the present application. As shown in FIG. 5, the battery module 100 may include N rows of battery cells 20 and N-1 spacer plate(s) 101. N is an integer greater than 1. In the figures of the present application, N is 2, as an example. That is, the battery module 100 includes two rows of battery cells 20 and a spacer plate 101, but this is not limited by the embodiment of the present application. For example, the battery module 100 may further include more rows of battery cells 20.

Each row of battery cells 20 in the N rows of battery cells 20 are arranged along a first direction, for example, the x direction in FIG. 5. The N rows of battery cells 20 are arranged along a second direction, for example, the y direction in FIG. 5, and the first direction is perpendicular to the second direction. In other words, the first direction is a direction in which the battery cells 20 in each row of battery cells 20 are arranged, and the second direction is a direction in which the battery cells 20 of N rows are arranged.

The spacer plate 101 extends along the first direction and disposed between two adjacent rows of battery cells 20, and the spacer plate 101 is fixedly connected to each of the battery cells 20 in the two rows of battery cells 20. As shown in FIG. 5, two adjacent rows of battery cells 20 may be respectively fixed on both sides of the spacer plate 101, that is to say, each battery cell 20 in two adjacent rows of battery cells 20 may be fixedly connected via a spacer plate 101. For example, as shown in FIG. 5, the spacer plate 101 is provided vertically, that is, the spacer plate 101 is perpendicular to the second direction and is disposed between two rows of battery cells 20.

In the embodiment of the present application, the battery module 100 includes N rows of battery cells 20 and N-1 spacer plate(s) 101, and the N-1 spacer plate(s) 101 are disposed between the N rows of battery cells 20. In other words, the spacer plate 101 is disposed inside the battery module 100, and the spacer plate 101 is no longer disposed on an outer side of the battery module 100. For example, a spacer plate 101 is disposed between two rows of battery cells 20, two spacer plates 101 are disposed between three rows of battery cells 20, and so on. With such arrangement, fewer spacer plates 101 may be used so that each of the battery cells 20 in the battery module 100 may be fixedly connected via the spacer plate 101.

A fixing structure 102 is provided on an end portion of the spacer plate 101 in the first direction, and the spacer plate 101 is fixed to the box body 11 via the fixing structure 102. As shown in FIG. 5, fixing structures 102 are provided at both ends of the spacer plate 101 in the x direction. The spacer plate 101 is fixed to the box body 11 via the fixing structure 102, so as to implement fixing the battery module 100 to the box body 11. As described above, each of the battery cells 20 in the battery module 100 is fixedly connected by the spacer plate 101, and then the fixed connection between each of the battery cells 20 and the box body 11 may be implemented via the fixing structure 102.

In the embodiment of the present application, the spacer plate 101 is disposed between two adjacent rows of battery cells 20 of the battery module 100, and the spacer plate 101 is fixedly connected to each of the battery cells 20 in the two rows of the battery cells 20, the fixing structure 102 is provided on the end portion of the spacer plate 101, and the spacer plate 101 is fixed to the box body 11 via the fixing structure 102. In this way, each of the battery cells 20 in the battery 10 is fixed to the box body 11 by the spacer plate 101 and the fixing structure 102, so each of the battery cells 20 may transmit its load to the box body 11, ensuring the structural strength of the battery 10. In this case, there is no need to provide a side plate on an outer side of the battery module 100, and also there is no need to provide a beam or other structures in the middle of the box body 11, which may greatly improve the space utilization rate of the interior of the battery 10, thereby improving the energy density of the battery 10. Thus, the technical solution of the embodiment of the present application may improve the energy density of the battery 10 while ensuring the structural strength of the battery 10, thereby improving the performances of the battery 10.

Optionally, the spacer plate 101 and each of the battery cells 20 in two adjacent rows of battery cells 20 may be fixedly connected by bonding. For example, in an embodiment of the present application, as shown in FIG. 6, the spacer plate 101 and each of the battery cells 20 in two adjacent rows of battery cells 20 may be bonded by the structural glue 110, but this is not limited by the embodiment of the present application.

Figure 6:
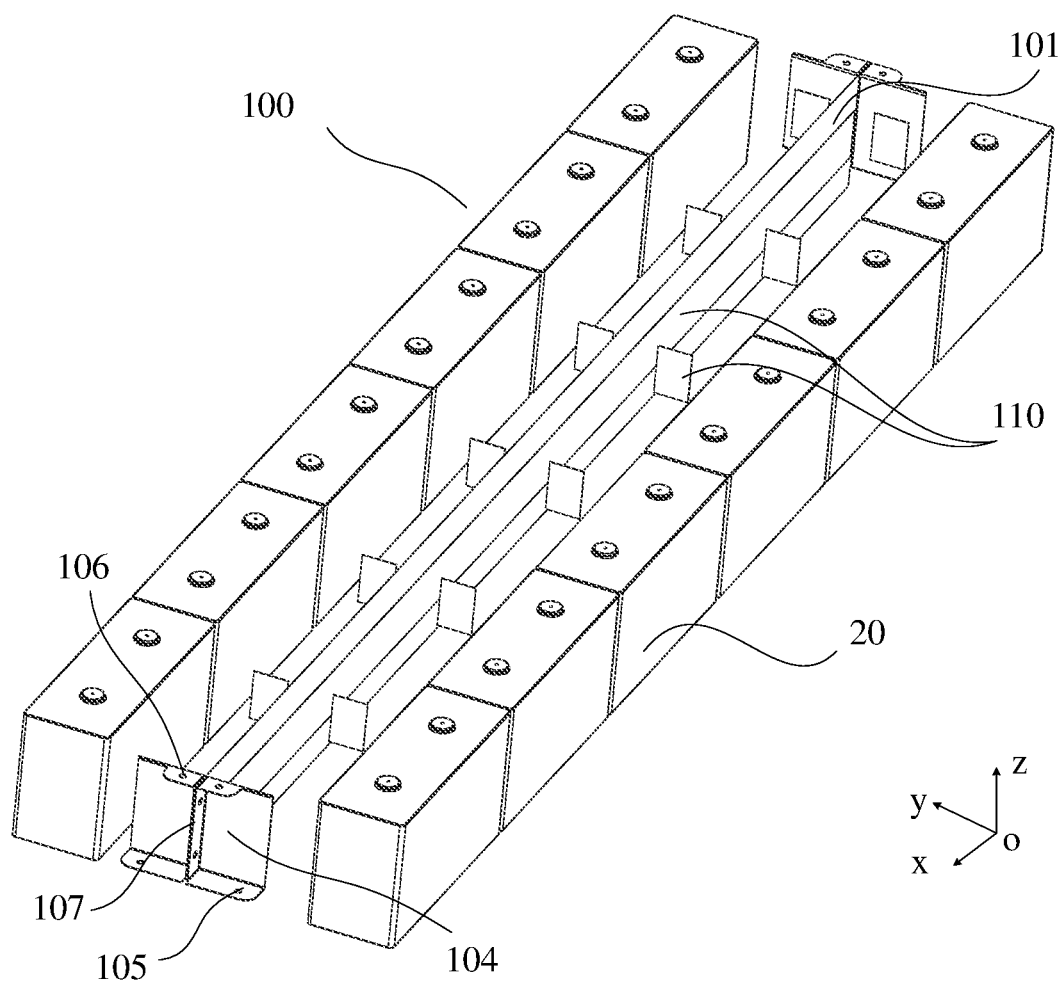
FIG. 6 is a schematic diagram of a battery module according to an embodiment of the present application.

Optionally, adjacent battery cells 20 in each row of battery cells 20 in the N rows of battery cells 20 may also be bonded, for example, as shown in FIG. 6, by the structural glue 110, but this is not limited by the embodiment of the present application. The fixing effect of the battery cells 20 may be further enhanced by fixing the adjacent battery cells 20 in each row of battery cells 20.

Optionally, the spacer plate 101 may be a metal plate; for example, may be a steel plate, or an aluminum plate, or a plastic plate. A material of the spacer plate 101 may also be a composite material. For example, another material is coated on the surface of the metal plate, which is not limited by the embodiment of the present application.

Optionally, a thickness of the spacer plate 101 may be 0.1-0.5 mm. For example, in an embodiment of the present application, the thickness of the spacer plate 101 may be 0.2-0.4 mm. Adopting the spacer plate 101 of the thickness may reduce a space occupied by the spacer plate 101 while ensuring the strength.

Optionally, in an embodiment of the present application, the battery 10 includes a plurality of the battery modules 100, the plurality of battery modules 100 arranged along the second direction, and there is a gap between adjacent battery modules 100. That is, a plurality of the battery modules 100 are arranged along the y direction, and there is no spacer plate 101 between the adjacent battery modules 100 with a certain gap. That is to say, in a battery module 100, a spacer plate 101 is provided between two rows of battery cells 20, and no spacer plate 101 is provided between adjacent battery modules 100. In this way, on one hand, the spacer plate 101 inside the battery 10 may be reduced as many as possible; and on the other hand, a certain gap may be formed between the adjacent battery modules 100 to provide an expansion space for the battery cells 20.

Optionally, in an embodiment of the present application, the battery module 100 includes two rows of battery cells 20, that is, N=2. Correspondingly, a spacer plate 101 is provided in the two rows of battery cells 20. As described above, no spacer plate 101 is provided between the adjacent battery modules 100. In this way, fewer spacer plates 101 may be provided in the battery 10 in the embodiment, but at the same time, it may be ensured that each of the battery cells 20 may be fixed to the spacer plate 101 and connected to the box body 11 through the spacer plate 101 and the fixing structure 102.

Optionally, in an embodiment of the present application, with respect to the battery module 100 including N rows of battery cells 20, N/2 spacer plate(s) 101 may be set, where each of the spacer plate(s) 101 is set between the two adjacent rows of battery cells 20, and each row of battery cells 20 is fixedly connected to a spacer plate 101. For example, with respect to a battery module 100 including four rows of battery cells 20, two spacer plates 101 may be provided, where a spacer plate 101 is provided between a first row and a second row of battery cells 20, and the other spacer plate 101 is provided between a third row and a fourth row of battery cells 20; and for a battery module 100 including six rows of battery cells 20, three spacer plates 101 may be provided, where the first spacer plate 101 is provided between the first row and the second row of battery cells 20, the second spacer plate 101 is provided between the third row and the fourth row of battery cells 20, and the third spacer plate 101 is provided between the fifth row and the sixth row of battery cells 20; and so on. Such setting may ensure that each of the battery cells 20 may be fixed to the spacer plate 101 and connected to the box body 11 through the spacer plate 101 and the fixing structure 102.

Optionally, in an embodiment of the present application, the fixing structure 102 may include a fixing plate 104. The fixing plate 104 is fixedly connected to the end portion of the spacer plate 101, and is fixedly connected to a battery cell 20 located at the end portion of the spacer plate 101. For example, for a cuboid battery cell 20, the fixing plate 104 may be vertically connected to the spacer plate 101, and the fixing plate 104 and the spacer plate 101 are respectively connected to two adjacent side walls of the cuboid battery cell 20, thereby further strengthening the fixing effect of the battery cells 20.

Optionally, the fixing plate 104 may be adopt the same material as that of the spacer plate 101, for example, metal, plastic or composite materials. A thickness of the fixing plate 104 may be the same as that of the spacer plate 101. The material or thickness of the fixing plate 104 may also be different from that of the spacer plate 101. For example, the fixing plate 104 may be configured with a higher strength or thickness, but this is not limited by the embodiment of the present application.

Optionally, a connection method between the spacer plate 101 and the fixing plate 104 may be resistance welding, resistance riveting, SPR riveting, locking bolts, or clamping. The fixing plate 104 may also be connected by resistance welding, resistance riveting, or SPR riveting, locking bolts, or clamping to the box body, but this is not limited by the embodiment of the present application.

Optionally, the fixing plate 104 and the battery cells 20 may be fixedly connected by means of bonding, such as boding by the structural glue, but this is not limited by the embodiment of the present application.

Optionally, in an embodiment of the present application, the fixing plate 104 includes a first connecting portion 105 formed by extending along the first direction to a direction away from the battery module 100, and the first connecting portion 105 is configured to be connected to a wall of the box body 11. For example, taking connecting the bottom wall of the box body 11 as an example, at the position where the fixing plate 104 is close to the bottom wall, a first connecting portion 105 may be formed in a direction away from the battery module 100, that is, extending outward, and is connected to the bottom wall of the box body 11. Of course, the first connecting portion 105 of the fixing plate 104 may also be connected to a side wall of the box body 11, which is not limited in the present application.

The first connecting portion 105 may be parallel to a wall of the connected box body 11. For example, the first connecting portion 105 is parallel to the bottom wall of the box body 11. An area of the first connecting portion 105 may be set according to the fixing method with the wall of the connected box body 11 to meet the required fixing effect.

Optionally, in an embodiment of the present application, the first connecting portion 105 may formed by bending the fixing plate 104. For example, the first connecting portion 105 may be formed by bending an edge of the fixing plate 104 close to the connected wall in a direction away from the battery module 100. Take connecting the bottom wall of the box body 11 as an example. The lower edge of the fixing plate 104 may be bent outward to form the first connecting portion 105. In this way, the first connecting portion 105 and a main body of the fixing plate 104 are an integral structure, which may enhance the connection performances.

Connecting the wall of the box body 11 through the first connecting portion 105 may implement the fixed connection between the fixing plate 104 and the wall of the box body 11, so that the loads of the battery cells 20 may be transmitted to the wall of the box body 11, thereby ensuring the structural strength of the battery 10.

Optionally, in an embodiment of the present application, the battery 10 may further include: a first connecting strip 13, the first connecting strip 13 extending along the second direction and configured to connect the plurality of the battery modules 100 in the box body 11. The first connecting strip 13 connects the plurality of battery modules 100 in the second direction, which may improve the overall structural strength of the plurality of battery modules 100.

In this case, the fixing plate 104 further includes a second connecting portion 106 formed by extending along the first direction to a direction away from the battery module 100, and the second connecting portion 106 is configured to be connected to the first connecting strip 13. Optionally, the second connecting portion 106 and the first connecting portion 105 may be respectively provided at both ends of the fixing plate 104. For example, when the first connecting portion 105 is connected to the bottom wall of the box body 11, the second connecting portion 106 may be provided at a position away from the bottom wall of the fixing plate 104. That is, at the position away from the bottom wall of the fixing plate 104, a second connecting portion 106 may be formed in a direction away from the battery module 100, that is, extending outward, and is connected to the first connecting strip 13. Thus, the structural strength of the battery 10 may be further ensured at a position away from the bottom wall through the first connecting strip 13.

The second connecting portion 106 may be parallel to the first connecting strip 13. An area of the second connecting portion 106 may be set according to the fixing method with the first connecting strip 13 to meet the required fixing effect.

Optionally, in an embodiment of the present application, the second connecting portion 106 may formed by bending the fixing plate 104. For example, the second connecting portion 106 may be formed by bending an edge of the fixing plate 104 close to the first connecting strip 13 in a direction away from the battery module 100. For example, an upper edge of the fixing plate 104 may be bent outward to form the second connecting portion 106. In this way, the second connecting portion 106 and the main body of the fixing plate 104 are an integral structure, which may enhance the connection performances.

Optionally, in an embodiment of the present application, the fixing plate 104 further includes a third connecting portion 107 formed by extending along the first direction to a direction away from the battery module 100, and the third connecting portion 107 is configured to connect the fixing plate 104 and the spacer plate 101. For example, at the position where the fixing plate 104 is connected to the spacer plate 101, a third connecting portion 107 may be formed in a direction away from the battery module 100, that is, extending outward, and the fixing plate 104 is fixedly connected to the spacer plate 101 through the third connecting portion 107.

Optionally, in addition to connecting the spacer plate 101, the third connecting portion 107 may also implement the connection between the fixing plates 104 at the same time. For example, each row of battery cells 20 in the battery module 100 is provided with a fixing plate 104, and the spacer plate 101 in the battery module 100 and the two fixing plates 104 corresponding to the two rows of the battery cells 20 are fixed together through the third connecting portion 107.

The third connecting portion 107 may be parallel to the spacer plate 101. An area of the third connecting portion 107 may be set according to the fixing method to meet the required fixing effect.

Optionally, in an embodiment of the present application, the third connecting portion 107 may be formed by bending the fixing plate 104. For example, the third connecting portion 107 may be formed by bending an edge of the fixing plate 104 close to the spacer plate 101 in a direction away from the battery module 100. In this way, the third connecting portion 107 and the main body of the fixing plate 104 are an integral structure, which may enhance the connection performances.

Optionally, in an embodiment of the present application, the spacer plate 101 may be integrally formed with the fixing plates 104 at both ends of one row of battery cells 20 in the two adjacent rows of battery cells 20, so that only the other row of battery cells 20 is needed to be provided with a fixing plate 104; or, the spacer plate 101 may be integrally formed with the fixing plates 104 corresponding to two adjacent rows of battery cells 20.

Figure 7:
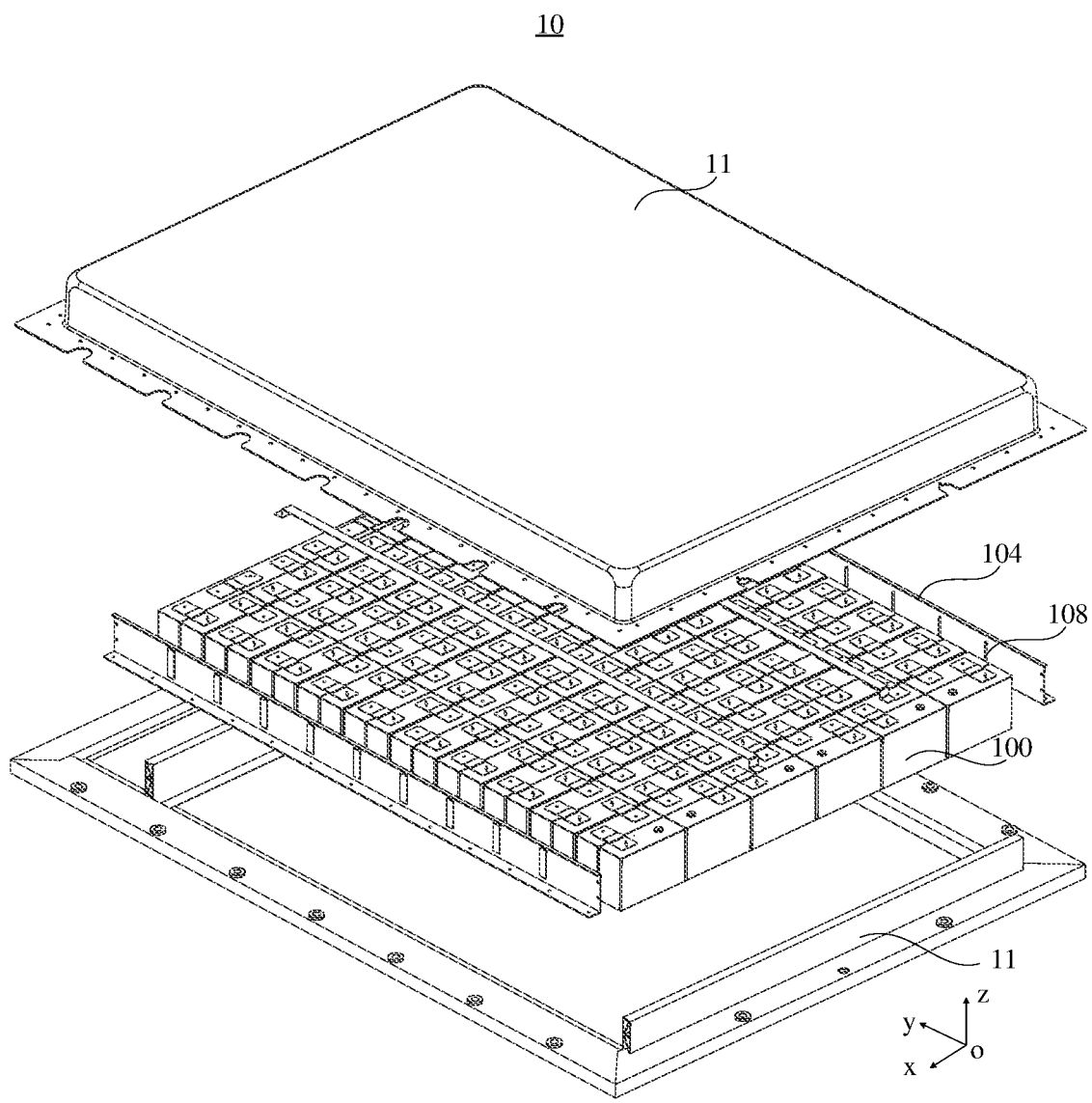
FIG. 7 is a schematic diagram of a battery according to an embodiment of the present application.

Optionally, in an embodiment of the present application, the fixing plate 104 corresponding to a plurality of battery modules 100 may be an integral structure. As shown in FIG. 7, the fixing plate 104 corresponding to the plurality of battery modules 100 may be a whole plate, and the plurality of battery modules 100 are fixed on the box body 11 through this whole plate, thereby improving the overall structural strength of the plurality of battery modules 100. Optionally, the fixing plate 104 may be provided with a limiting bar 108 corresponding to the battery module 100, and the limiting bar 108 is configured to insert into a gap between the adjacent battery modules 100, so as to facilitate an installation of the battery module 100.

Figure 8:
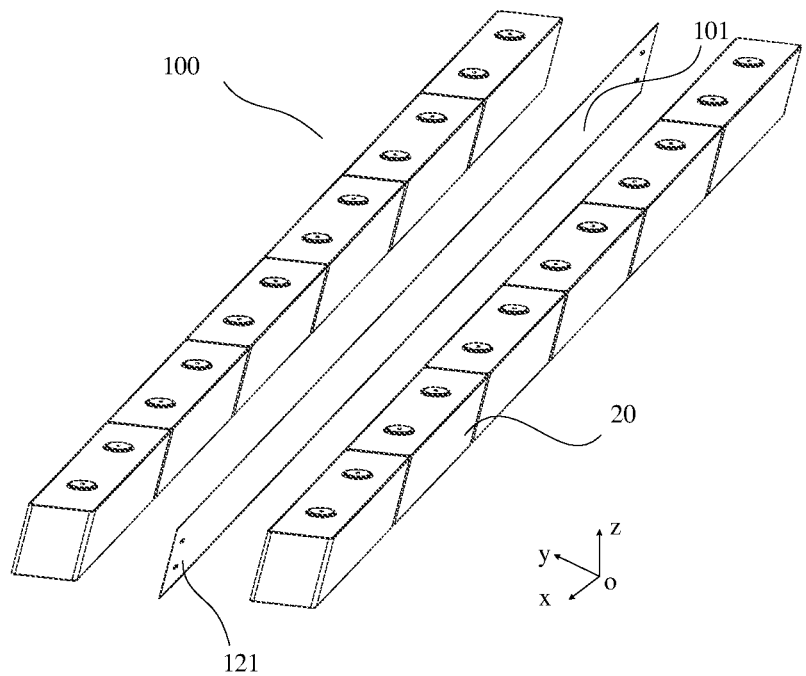
FIG. 8 is a schematic diagram of a battery module according to an embodiment of the present application.

Optionally, in an embodiment of the present application, as shown in FIG. 8, the end portion of the spacer plate 101 protrudes from the N rows of battery cells 20 in the first direction, and the fixing structure 102 includes a first protrusion portion 121 of the end portion of the spacer plate 101 that protrudes from the N rows of battery cells 20 in the first direction. The spacer plate 101 may connect the wall of the box body 11 through the first protrusion portion 121. For example, a connecting portion corresponding to the first protrusion portion 121 may be provided on the wall of the box body 11 to implement the connection between the two.

Figure 9:
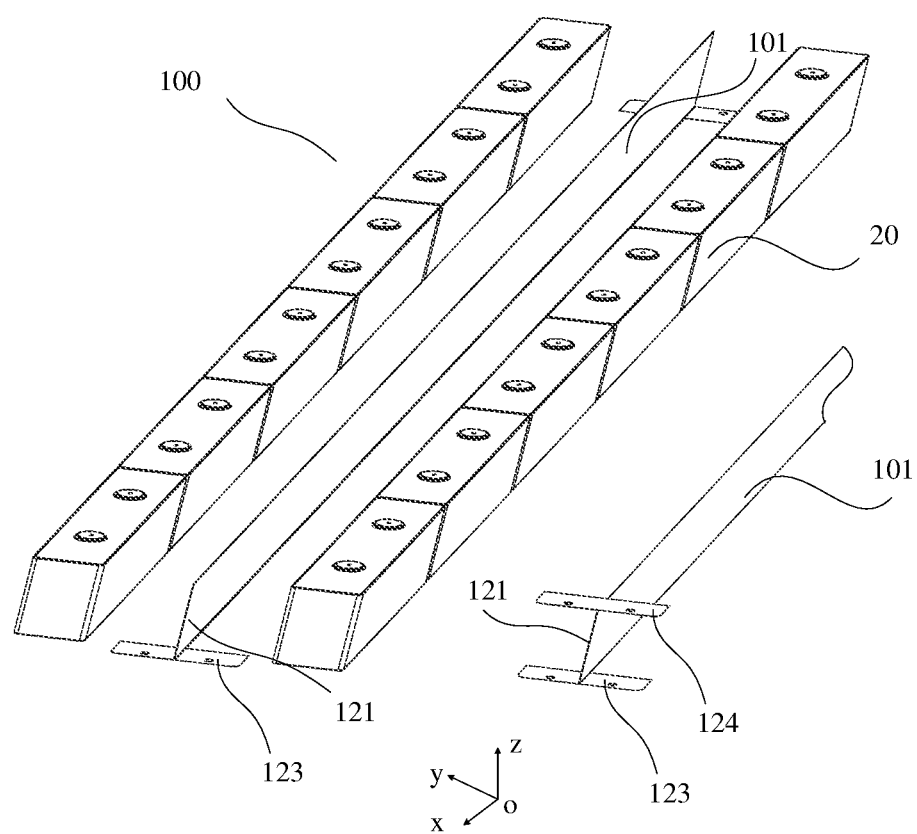
FIG. 9 is a schematic diagram of a battery module according to an embodiment of the present application.

Optionally, in an embodiment of the present application, as shown in FIG. 9, the fixing structure 102 further includes a first extending portion 123, the first extending portion 123 is fixedly connected to the first protrusion portion 121 and extends along the second direction, and the first extending portion 123 is configured to be connected to a wall of the box body 11. For example, taking connecting the bottom wall of the box body 11 as an example, at a position of the first protrusion portion 121 close to the bottom wall, the first extending portion 123 is fixedly connected to the first protrusion portion 121 and extends along the second direction to form an area connecting to the bottom wall, thereby connecting the bottom wall of the box body 11. Of course, the first extending portion 123 of the fixing structure 102 may also be connected to the side wall of the box body 11, which is not limited in the present application.

The first extending portion 123 may be parallel to the wall of the connected box body 11. For example, the first extending portion 123 is parallel to the bottom wall of the box body 11. An area of the first extending portion 123 may be set according to the fixing method with the wall of the connected box body 11 to meet the required fixing effect.

Optionally, the first extending portion 123 and the first protrusion portion 121 may be integrally formed, so that the connection performances may be enhanced.

Optionally, in an embodiment of the present application, in the case that the battery 10 is provided with the first connecting strip 13, the fixing structure 102 further includes a second extending portion 124, the second extending portion 124 is fixedly connected to the first protrusion portion 121 and extends along the second direction, and the second extending portion 124 is configured to be connected to the first connecting strip 13. For example, when the first extending portion 123 is connected to the bottom wall of the box body 11, the second extending portion 124 may be provided at a position of the first protrusion portion 121 away from the bottom wall. That is, at a position of the first protrusion portion 121 away from the bottom wall, the second extending portion 124 is fixedly connected to the first protrusion portion 121 and extends along the second direction to form an area connecting the first connecting strip 13, thereby connecting the first connection strip 13. Thus, the structural strength of the battery 10 may be further ensured at a position away from the bottom wall through the first connecting strip 13.

The second extending portion 124 may be parallel to the first connecting strip 13. An area of the second extending portion 124 may be set according to the fixing method with the first connecting strip 13 to meet the required fixing effect.

Optionally, the second extending portion 124 and the first protrusion portion 121 may be integrally formed, so that the connection performances may be enhanced.

Figure 10:
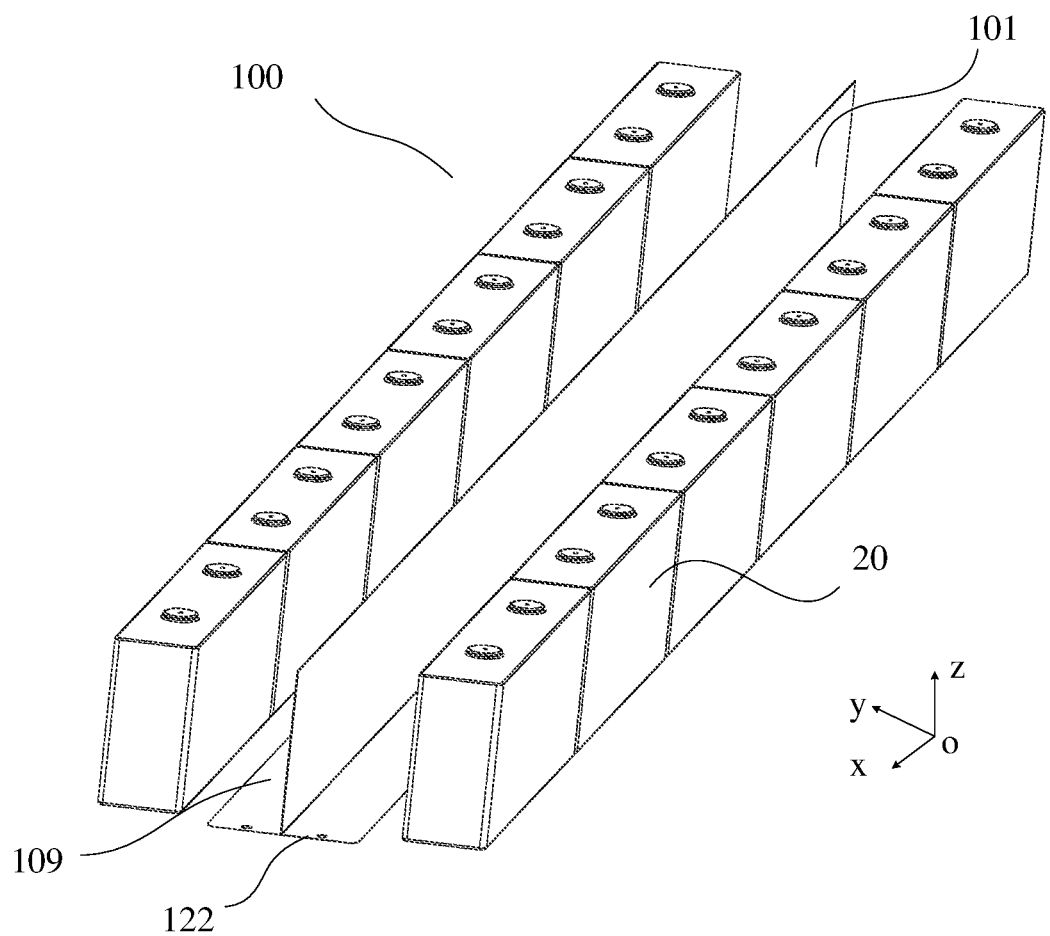
FIG. 10 is a schematic diagram of a battery module according to an embodiment of the present application.

Optionally, in an embodiment of the present application, as shown in FIG. 10, the battery 100 may further include: an attaching plate 109. The attaching plate 109 extends along the first direction and fixedly connected to the spacer plate 101, and the attaching plate 109 protrudes from the spacer plate 101 along the second direction and attached to each of the battery cells 20 in the two adjacent rows of battery cells 20. For example, the attaching plate 109 may be vertically connected to the spacer plate 101, making the spacer plate 101 to connect the side wall of the battery cells 20; and the attaching plate 109 is connected to the bottom wall and/or the side wall of the battery cell 20, thereby further strengthening fixing effect of the battery cells 20.

Optionally, the attaching plate 109 may use the same material as that of the spacer plate 101, for example, metal, plastic, or composite materials. A thickness of the attaching plate 109 may also be the same as that of the spacer plate 101. The material or thickness of the attaching plate 109 may also be different from that of the spacer plate 101, which is not limited in the embodiment of the present application.

Optionally, the attaching plate 109 and each of the battery cells 20 in two adjacent rows of battery cells 20 may be fixedly connected by bonding. In this way, each of the battery cells 20 is fixed by the attaching plate 109 and the spacer plate 101, so that the fixing effect may be further improved.

Optionally, the attaching plate 109 and each of the battery cells 20 may be fixedly connected by bonding, such as boding by the structural glue, but this is not limited by the embodiment of the present application.

Optionally, in an embodiment of the present application, the attaching plate 109 protrudes from the N rows of battery cells 20 in the first direction, and the fixing structure 102 includes a second protrusion portion 122 of the attaching plate 109 that protrudes from the N rows of battery cells 20 in the first direction. The second protrusion portion 122 may be configured to be connected to the wall of the box body 11, for example, may be connected to the bottom wall of the box body 11, so that the loads of the batter cells 20 may be transmitted to the wall of the box body 11, thereby ensuring the structural strength of the battery 10. Of course, the second protrusion portion 122 of the attaching plate 109 may also be connected to the side wall of the box body 11, which is not limited in the present application.

An area of the second protrusion portion 122 may be set according to the fixing method with the wall of the box body 11 to be connected to meet the required fixing effect.

Optionally, in an embodiment of the present application, a cross-section shape of the spacer plate 101 and the attaching plate 109 perpendicular to the first direction may be an inverted T type, an I type, a Z type, an S type, a T type, a C type or an L type, etc.

Specifically, when the cross-section shape of the spacer plate 101 and the attaching plate 109 perpendicular to the first direction is an inverted T type or an L type, the second protrusion portion 122 may be configured to be connected to the bottom wall of the box body 11; when an I type, a Z type, an S type, or a C type, the second protrusion portion 122 may be configured to be connected to the bottom wall of the box body 11 and the first connecting strip 13; and when a T-shape, the second protrusion portion 122 may be configured to be connected to the top wall of the box body 11 and/or the first connecting strip 13.

Optionally, in an embodiment of the present application, the spacer plate 101 and the attaching plate 109 may be integrally formed, so that the connection performances between the spacer plate 101 and the attaching plate 109 may be improved. The spacer plate 101 and the attaching plate 109 may also be connected in various fixing manners, which is not limited in the embodiment of the present application.

Optionally, in an embodiment of the present application, the battery cell 20 is a cuboid battery cells 20. The cuboid battery cells 20 includes two opposite first side walls and two opposite second side walls, and an area of the first side wall is larger than an area of the second side wall, that is, the first side wall is a wide side wall, and the second side wall is a narrow side wall. In this case, the spacer plate 101 is fixedly connected to the first side wall, that is, the wide side wall. That is to say, in the present embodiment, narrow side walls of each row of battery cells 20 are connected so as to be arranged in a row along the first direction; and the spacer plate 101 is fixedly connected with the wide side wall of each of the battery cells 20. In this way, the spacer plate 101 may more easily receive the loads of the battery cells 20, so as to facilitate the loads of the battery cells 20 to be transmitted to the box body.

Figure 11:
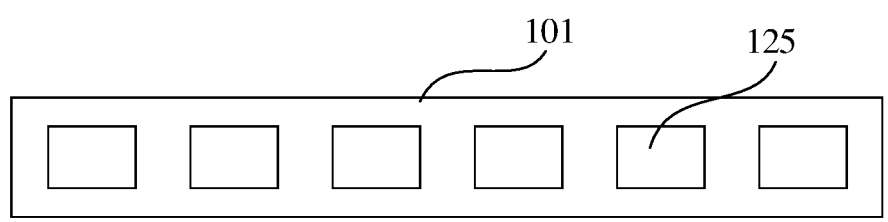
FIG. 11 is a schematic diagram of a spacer plate according to an embodiment of the present application.

Optionally, in an embodiment of the present application, as shown in FIG. 11, the spacer plate 101 may have a hole 125 disposed corresponding to the first side wall, and an area of the hole 125 is smaller than an area of the first side wall. In this way, a frame of each hole 125 may be fixedly connected to the first side wall of the battery cells 20. The hole 125 may be square or circular, which is not limited in the embodiment of the present application. Providing a hole 125 on the spacer plate 101 may reduce the material of the spacer plate 101, thereby reducing a weight of the spacer plate 101.

Figure 12:
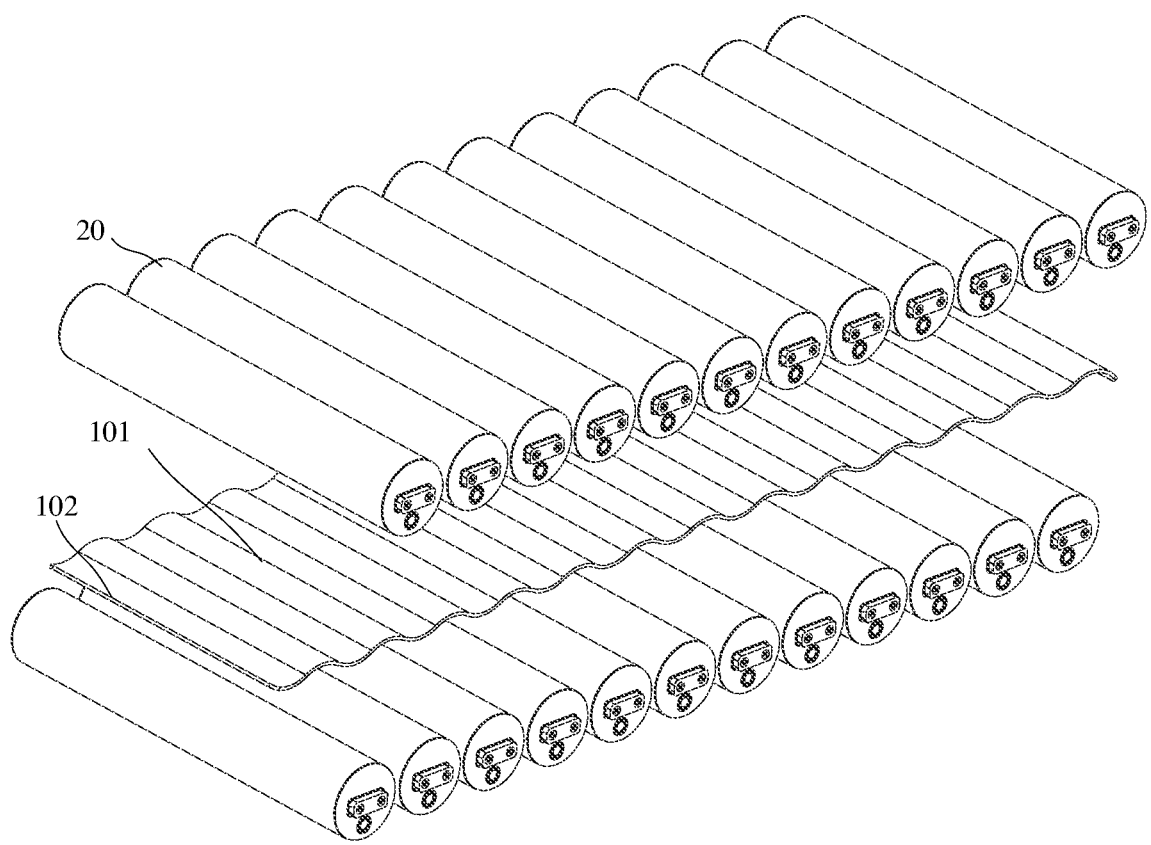
FIG. 12 is a schematic diagram of an S-shaped spacer plate according to an embodiment of the present application.

Optionally, in an embodiment of the present application, as shown in FIG. 12, the battery cell 20 may also be a cylindrical battery cell 20. In this case, the spacer plate 101 is an S-shaped spacer plate 101 adapted to a side of the cylindrical battery cell 20, which may better connect each of the battery cells 20.

It should be understood that for FIG. 12, the corresponding fixing structure 102 may adopt the settings in the foregoing embodiments, and for the sake of brevity, details are not described herein again.

Optionally, in an embodiment of the present application, the spacer plate 101 of the attaching plate 109 may be an insulation plate. For example, a material of the spacer plate 101 or the attaching plate 109 may be an insulation material, or a surface of the spacer plate 101 or the attaching plate 109 may be sprayed with an insulating material, so that insulation between the battery cells 20 may be implemented while fixing the battery cells 20.

Optionally, in an embodiment of the present application, the spacer plate 101 or the attaching plate 109 may be a cooling plate or a heating plate. For example, the spacer plate 101 or the attaching plate 109 may be provided with a cooling channel or a heating resistance wire, so that the battery cells 20 may be cooled or heated while fixing the battery cells 20.

Optionally, in an embodiment of the present application, the spacer plate 101 and the box body 11 may be integrally formed. For example, the spacer plate 101 may be extruded from the profile of the box body 11. In this way, connection performances between the spacer plate 101 and the box body 11 may be improved.

Optionally, in an embodiment of the present application, the battery 10 further includes: a bus component 12. The bus component 12 is configured to electrically connect the battery cells 20. Among that, at least three battery cells 20 in the battery module 100 are connected to a battery cell 20 in other battery modules 100 through the bus component 12. More battery cells 20 are connected to the battery cell 20 in other battery modules 100 through the bus component 12, and the connection performances between the battery modules 100 may be enhanced through the bus component 12.

Optionally, the bus component 12 may connect the battery cells 20 in series along the second direction. In the case that each row of battery cells 20 in the battery module 100 is arranged along the first direction, the bus component 12 connects the battery cells 20 in series along the second direction, so that each pair of the adjacent battery cells 20 between the adjacent battery modules 100 are connected through the bus component 12, thereby enhancing the connection performances between the battery modules 100.

Optionally, in an embodiment of the present application, the battery 10 further includes: a second connecting strip 14. When the battery module 100 is disposed on the bottom wall of the box body 11, the second connecting strip 14 is disposed on a surface of the battery module 100 away from the bottom wall of the box body 11, and the second connecting strip 14 extends along the second direction, and is fixedly connected to the plurality of battery modules 100 in the box body 11. That is to say, the second connecting strip 14 is provided on an upper surface of the battery module 100, so that the battery cells 20 are constrained in the second direction, the structural strength of the battery 10 may be increased, and an expansion force of the battery cells 20 may be resisted at the same time.

It should be understood that the relevant parts in each embodiment of the present application may be referred to each other, and for the sake of brevity, details are not described herein again.

An embodiment of the present application further provides a power consumption device, which may include the battery 10 in the above embodiments. Optionally, the power consumption device may be a vehicle 1, a ship or a spacecraft, etc., but this is not limited by the embodiment of the present application.

The battery 10 and the power consumption device of the embodiment of the present application are described above, and a method and a device for producing a battery of the embodiments of the present application will be described below. For the parts that are not described in detail, reference is made to the foregoing embodiments.

Figure 13:
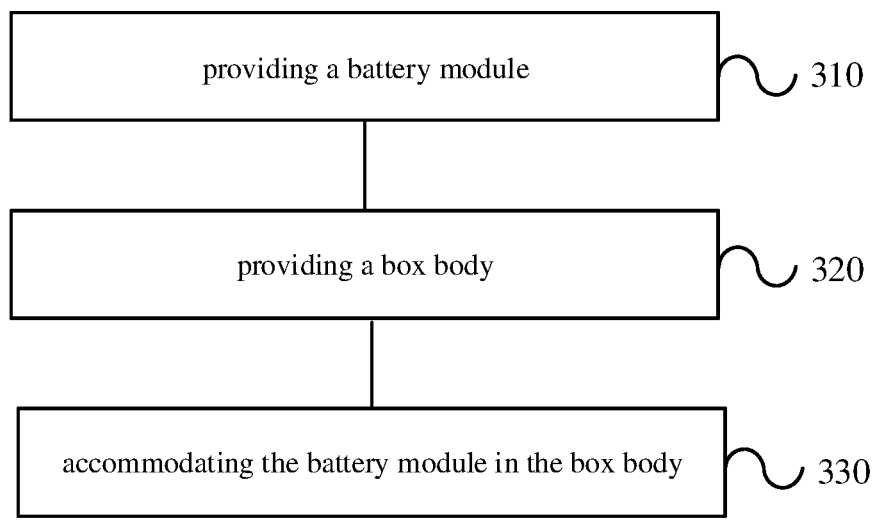
FIG. 13 is a schematic flowchart of a method for producing a battery according to an embodiment of the present application.

FIG. 13 shows a schematic flowchart of a method 300 for producing a battery according to an embodiment of the present application. As shown in FIG. 13, the method 300 may include:

310, providing a battery module 100, the battery module 100 including: N rows of battery cells 20, each row of battery cells 20 in the N rows of battery cells 20 arranged along a first direction, the N rows of battery cells 20 arranged along a second direction, N being an integer greater than 1, and the first direction being perpendicular to the second direction; N-1 spacer plate 101, the spacer plate 101 extending along the first direction and disposed between two adjacent rows of battery cells 20, and the spacer plate 101 fixedly connected to each of the battery cells 20 in the two rows of the battery cells 20; where a fixing structure 102 is provided on an end portion of the spacer plate 101 in the first direction;

320, providing a box body 11;

330, accommodating the battery module 100 in the box body 11, where the spacer plate 101 is fixed to the box body 11 via the fixing structure 102.

Figure 14:
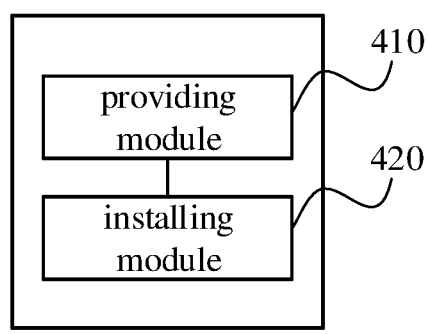
FIG. 14 is a schematic block diagram of a device for producing a battery according to an embodiment of the present application.

FIG. 14 is a schematic block diagram of a device 400 for producing a battery according to an embodiment of the present application. As shown in FIG. 14, the device 400 for producing the battery may include: a providing module 410 and an installing module 420.

The providing module 410 is configured to provide a battery module 100 and a box body 11, the battery module 100 including: N rows of battery cells 20, each row of battery cells 20 in the N rows of battery cells 20 arranged along a first direction, and the N rows of battery cells 20 arranged along a second direction, N being an integer greater than 1, and the first direction being perpendicular to the second direction; N-1 spacer plate(s) 101, the spacer plate 101 extending along the first direction and disposed between two adjacent rows of battery cells 20, and the spacer plate 101 fixedly connected to each of the battery cells 20 in the two rows of the battery cells 20; where a fixing structure 102 is provided on an end portion of the spacer plate 101 in the first direction.

The installing module 420 is configured to accommodate the battery module 100 in the box body 11, where the spacer plate 101 is fixed to the box body 11 via the fixing structure 102.

Although the present application is already described with reference to the preferred embodiments, various improvements may be made to the present application and the components therein may be replaced with equivalents without departing from the scope of the present application. In particular, as long as there is no structural conflict, various technical features mentioned in the various embodiments may be combined in any manner. The present application is not limited to the specific embodiments disclosed in the text, but includes all technical solutions falling within the scope of the claims.

What is claimed is:

1. A battery, comprising:
a battery module and a box body, the battery module being accommodated in the box body;
the battery module comprising:
N rows of battery cells, each row of battery cells in the N rows of battery cells comprising a plurality of battery cells arranged along a first direction, the N rows of battery cells arranged along a second direction, N being an integer greater than 1, and the first direction being perpendicular to the second direction;

N−1 spacer plate(s), each spacer plate extending along the first direction and disposed between two adjacent rows of battery cells, and each spacer plate fixedly connected to each of the battery cells in the two rows of the battery cells;

wherein a fixing structure is provided on an end portion of each spacer plate in the first direction, and each spacer plate is fixed to the box body via the fixing structure;

wherein the battery module is disposed on a bottom wall of the box body;

the battery further comprising:

a second connecting strip, disposed on a surface of the battery module away from the bottom wall of the box body, and the second connecting strip extending along the second direction, and fixedly connected to a plurality of battery modules in the box body.

2. The battery according to claim 1, wherein the battery comprises the plurality of the battery modules, the plurality of the battery modules arranged along the second direction, wherein there is a gap between adjacent battery modules.

3. The battery according to claim 1, wherein the fixing structure comprises a fixing plate, and the fixing plate is fixedly connected to the end portion of each spacer plate, and is fixedly connected to a battery cell located at the end portion of each spacer plate.

4. The battery according to claim 3, wherein the fixing plate comprises a first connecting portion formed by extending along the first direction to a direction away from the battery module, and the first connecting portion is configured to be connected to a wall of the box body.

5. The battery according to claim 4, wherein the battery further comprises:

a first connecting strip, the first connecting strip extending along the second direction and configured to connect the plurality of the battery modules in the box body;

wherein the fixing plate further comprises a second connecting portion formed by extending along the first direction to a direction away from the battery module, and the second connecting portion is configured to be connected to the first connecting strip.

6. The battery according to claim 4, wherein the fixing plate further comprises a third connecting portion formed by extending along the first direction to a direction away from the battery module, and the third connecting portion is configured to connect the fixing plate and each spacer plate.

7. The battery according to claim 1, wherein the end portion of each spacer plate protrudes from the N rows of the battery cells in the first direction, and the fixing structure comprises a first protrusion portion of the end portion of each spacer plate that protrudes from the N rows of the battery cells in the first direction.

8. The battery according to claim 7, wherein the fixing structure further comprises a first extending portion, the first extending portion fixedly connected to the first protrusion portion and extending along the second direction, wherein the first extending portion is configured to be connected to a wall of the box body.

9. The battery according to claim 8, wherein the battery further comprises:

a first connecting strip, the first connecting strip extending along the second direction and configured to connect the plurality of the battery modules in the box body;

wherein the fixing structure further comprises a second extending portion, the second extending portion fixedly connected to the first protrusion portion and extending along the second direction, wherein the second extending portion is configured to be connected to the first connecting strip.

10. The battery according to claim 1, wherein the battery module further comprises:

an attaching plate, the attaching plate extending along the first direction and fixedly connected to each spacer plate, and the attaching plate protruding from each spacer plate along the second direction and attached to each of the battery cells in the two adjacent rows of the battery cells.

11. The battery according to claim 10, wherein the attaching plate protrudes from the N rows of the battery cells in the first direction, and the fixing structure comprises a second protrusion portion of the attaching plate that protrudes from the N rows of the battery cells in the first direction.

12. The battery according to claim 1, wherein the battery cell is a cuboid battery cell, the cuboid battery cell comprises two opposite first side walls and two opposite second side walls, an area of the first side wall is larger than an area of the second side wall, and each spacer plate is fixedly connected to the first side wall.

13. The battery according to claim 12, wherein each spacer plate has a hole disposed corresponding to the first side wall, and an area of the hole is smaller than an area of the first side wall.

14. The battery according to claim 1, wherein the battery cell is a cylindrical battery cell, and each spacer plate is an S-shaped spacer plate adapted to a side of the cylindrical battery cell.

15. The battery according to claim 1, wherein each spacer plate is an insulation plate, a cooling plate or a heating plate.

16. The battery according to claim 1, wherein the battery further comprises:

a bus component, configured to electrically connect the battery cells;

wherein at least three battery cells in the battery module are connected to a battery cell in other battery modules through the bus component.

17. The battery according to claim 16, wherein the bus component is configured to connect the battery cells in series along the second direction.

18. A power consumption device, comprising: a battery configured to provide electric energy;

the battery comprising:

a battery module and a box body, the battery module being accommodated in the box body;

the battery module comprising:

N rows of battery cells, each row of battery cells in the N rows of battery cells comprising a plurality of battery cells arranged along a first direction, the N rows of battery cells arranged along a second direction, N being an integer greater than 1, and the first direction being perpendicular to the second direction;

N−1 spacer plate(s), each spacer plate extending along the first direction and disposed between two adjacent rows of battery cells, and each spacer plate fixedly connected to each of the battery cells in the two rows of the battery cells;

wherein a fixing structure is provided on an end portion of each spacer plate in the first direction, and each spacer plate is fixed to the box body via the fixing structure;

wherein the battery module is disposed on a bottom wall of the box body:

the battery further comprising:

a second connecting strip, disposed on a surface of the battery module away from the bottom wall of the box body, and the second connecting strip extending along the second direction, and fixedly connected to a plurality of battery modules in the box body.

19. A device for producing a battery, comprising:

a providing module, configured to provide a battery module and a box body, the battery module comprising:

N rows of battery cells, each row of battery cells in the N rows of battery cells comprising a plurality of battery cells arranged along a first direction, and the N rows of battery cells arranged along a second direction, N being an integer greater than 1, and the first direction being perpendicular to the second direction;

N−1 spacer plate(s), each spacer plate extending along the first direction and disposed between two adjacent rows of battery cells, and each spacer plate fixedly connected to each of the battery cells in the two rows of the battery cells;

wherein a fixing structure is provided on an end portion of each spacer plate in the first direction; and an installing module, configured to accommodate the battery module in the box body, wherein each spacer plate is fixed to the box body via the fixing structure;

wherein the battery module is disposed on a bottom wall of the box body;

the battery further comprising:

a second connecting strip, disposed on a surface of the battery module away from the bottom wall of the box body, and the second connecting strip extending along the second direction, and fixedly connected to a plurality of battery modules in the box body.

\* \* \* \* \*